United States Patent
Sugie

(10) Patent No.: US 7,728,540 B2
(45) Date of Patent: Jun. 1, 2010

(54) MOTOR DRIVING CIRCUIT

(75) Inventor: Hisashi Sugie, Kyoto (JP)

(73) Assignee: Rohm Co., Ltd. (JP)

( * ) Notice: Subject to any disclaimer, the term of this patent is extended or adjusted under 35 U.S.C. 154(b) by 307 days.

(21) Appl. No.: 11/860,903

(22) Filed: Sep. 25, 2007

(65) Prior Publication Data

US 2008/0247734 A1    Oct. 9, 2008

(30) Foreign Application Priority Data

Sep. 25, 2006    (JP)    ............... 2006-258855

(51) Int. Cl.
*H02P 7/00*    (2006.01)
(52) U.S. Cl. ................... 318/432; 318/632
(58) Field of Classification Search ........... 318/632, 318/461, 600, 432
See application file for complete search history.

(56) References Cited

U.S. PATENT DOCUMENTS

| 5,590,106 A * | 12/1996 | Shimizume et al. | 369/47.42 |
| 5,694,380 A * | 12/1997 | Shimizume et al. | 369/47.45 |
| 5,773,938 A * | 6/1998 | Seong et al. | 318/6 |
| 2005/0057209 A1* | 3/2005 | Andoh et al. | 318/696 |

FOREIGN PATENT DOCUMENTS

JP    6-30589    2/1994

* cited by examiner

*Primary Examiner*—Rina I Duda
(74) *Attorney, Agent, or Firm*—Cantor Colburn LLP

(57) ABSTRACT

A motor driving circuit drives a motor on receipt of an error signal having a digital value corresponding to a deviation between a current rotation speed of the motor, which is the subject to be driven, and its target value. A digital filter eliminates a high-frequency component of the error signal. A driving unit controls an electric current flowing through the motor in accordance with the digital value of the error signal from which the high-frequency component is eliminated by the digital filter. An upper-limit value setting unit sets an upper limit value to the digital value of the error signal input to the digital filter. The upper-limit value setting unit is configured to be capable of changing the upper limit value in accordance with a setting signal from the outside.

9 Claims, 3 Drawing Sheets

MOTOR DRIVING CIRCUIT

BACKGROUND OF THE INVENTION

1. Field of the Invention

The present invention relates to a motor driving technique, and more particularly to a control technique of a rotation speed (frequency) of a motor.

2. Description of the Related Art

A motor driving apparatus that drives a DC (direct current) motor or a spindle motor with a desired rotation speed monitors the rotation speed of the motor so as to produce a driving signal on the basis of the deviation from a desired target value. The motor driving apparatus that controls a motor as described above may employ a speed discriminator disclosed in the Japanese Patent Application (Laid-Open) No. H06-30589, for example.

Some of the speed discriminators compare a current rotation speed of the motor and a rotation speed that is a desired target value, and outputs an error signal according to the deviation as a digital value. This error signal produces a pulse-width modulation signal having a duty ratio according to the digital value of the error signal after a high-frequency component of the error signal is eliminated with the use of a low-pass digital filter. And the error signal feedback-controls the time for energizing the motor, on the basis of the pulse-width modulation signal, so as to stabilize the rotation speed at the target value.

When the digital filter is formed in an IIR (Infinite Impulse Response) type of nth order, the filter is constructed by utilizing a difference between the sampling value at the present point and the sampling value at the sampling timing before the present point. Therefore, as the sampling frequency of the error signal is high, the difference is reduced, so that the coefficient of the filter needs to be increased. Specifically, as the sampling frequency of the error signal is high, the characteristic of the digital filter is improved, thereby providing an advantage that the transient response, e.g., the starting characteristic of the motor can be improved, but causing a problem that the circuit size of the digital filter increases.

SUMMARY OF THE INVENTION

The present invention is accomplished in view of the above-mentioned problem, and a general purpose thereof is to provide a motor driving technique that suppresses the increase in the circuit size and has enhanced starting characteristic.

One embodiment of the present invention provides a motor driving circuit that drives a motor on receipt of an error signal having a digital value corresponding to the deviation between a current rotation speed of a motor, which is a subject to be driven, and its target value. The motor driving circuit includes a digital filter that eliminates a high-frequency component of the error signal, a driving unit that controls an electric current flowing through the motor in accordance with the digital value of the error signal from which the high-frequency component is eliminated by the digital filter, and an upper-limit value setting unit that sets an upper limit value to the digital value of the error signal input to the digital filter.

Immediately after the starting of the motor, the deviation between the current rotation speed of the motor and its target value becomes large, so that the digital value of the error signal increases with the increased deviation. However, according to this embodiment, an upper limit value is set to the digital value, whereby the input value of the digital filter does not sharply increase. Therefore, an overshoot in which the rotation speed of the motor greatly exceeds the target value can be prevented, and the starting characteristic of the motor can be improved. Since it is unnecessary to increase the sampling frequency in this embodiment, the increase in the circuit size can be suppressed. It is to be noted that the "upper limit value" means a value lower than the maximum value that the error signal can take in the state where the upper limit value is not set, and the maximum value that the error signal can take in the state where "the upper limit value is set" is its upper limit value.

The error signal is m-bit (m is a natural number), and the upper-limit value setting unit may invalidate the high-order n-bit (n is a natural number satisfying n<m) of the digital value. The upper limit value can easily be set by invalidating the high-order n-bit among m bits of the error signal.

The bit number n that is to be invalidated may be settable from the outside. In this case, the upper limit value of the error signal can be adjusted according to the characteristic of the motor that is the subject to be driven, whereby the starting characteristic can be optimized for every motor.

The error signal may be an output from a speed discriminator that outputs a digital signal corresponding to the frequency deviation between an output signal from a speed sensor, which detects the rotation speed of the motor, and a clock signal according to the target value of the rotation speed.

In one embodiment, at least a part of the digital filter may be composed of an infinite impulse response type, wherein the value of the output from the filter block of the infinite impulse response type may be initialized to a predetermined initial value upon starting the drive of the motor.

Since the output of the infinite impulse response filter gradually approaches a value determined by the error signal input to the digital filter from the set initial value in this case, it is prevented that the output of the digital filter is set sharply to a great value upon the starting, whereby the overshoot of the rotation speed of the motor can be prevented.

In one embodiment, the initial value of the output from the filter block of the infinite impulse response type may be externally settable.

The motor driving circuit may be integrated on one semiconductor substrate. The term "integrated" includes the case in which all the components of the circuit are formed on a semiconductor substrate and the case in which main components of the circuit are integrated on one semiconductor substrate, wherein some resistors or capacitors may be provided at the outside of the semiconductor substrate in order to adjust the circuit constant. The circuit area can be reduced by integrating the driving circuit as one LSI.

Another embodiment of the present invention is a motor driving apparatus. This apparatus includes a speed sensor that detects a rotation speed of a motor, which is a subject to be driven, a clock signal generating unit that generates a clock signal having a frequency according to a target value of the rotation speed of the motor, a speed discriminator that receives the output signal from the speed sensor and the clock signal so as to output an error signal having a digital value according to the deviation between the frequencies of two signals, and a motor driving circuit according to the above embodiment that drives the motor on the basis of the error signal output from the speed discriminator.

According to this embodiment, the starting characteristic of the motor can be improved, while suppressing the increase in the circuit size of the motor driving apparatus.

Still another embodiment of the present invention is an electronic apparatus. This electronic apparatus includes a motor, the above-mentioned motor driving apparatus that drives the motor, and a movable unit whose position is changed by the motor.

According to this embodiment, the starting time taken for the rotation speed of the motor to reach the target value can be shortened, whereby the movable unit of the electronic apparatus can be operated with increased speed.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

Figure 1:
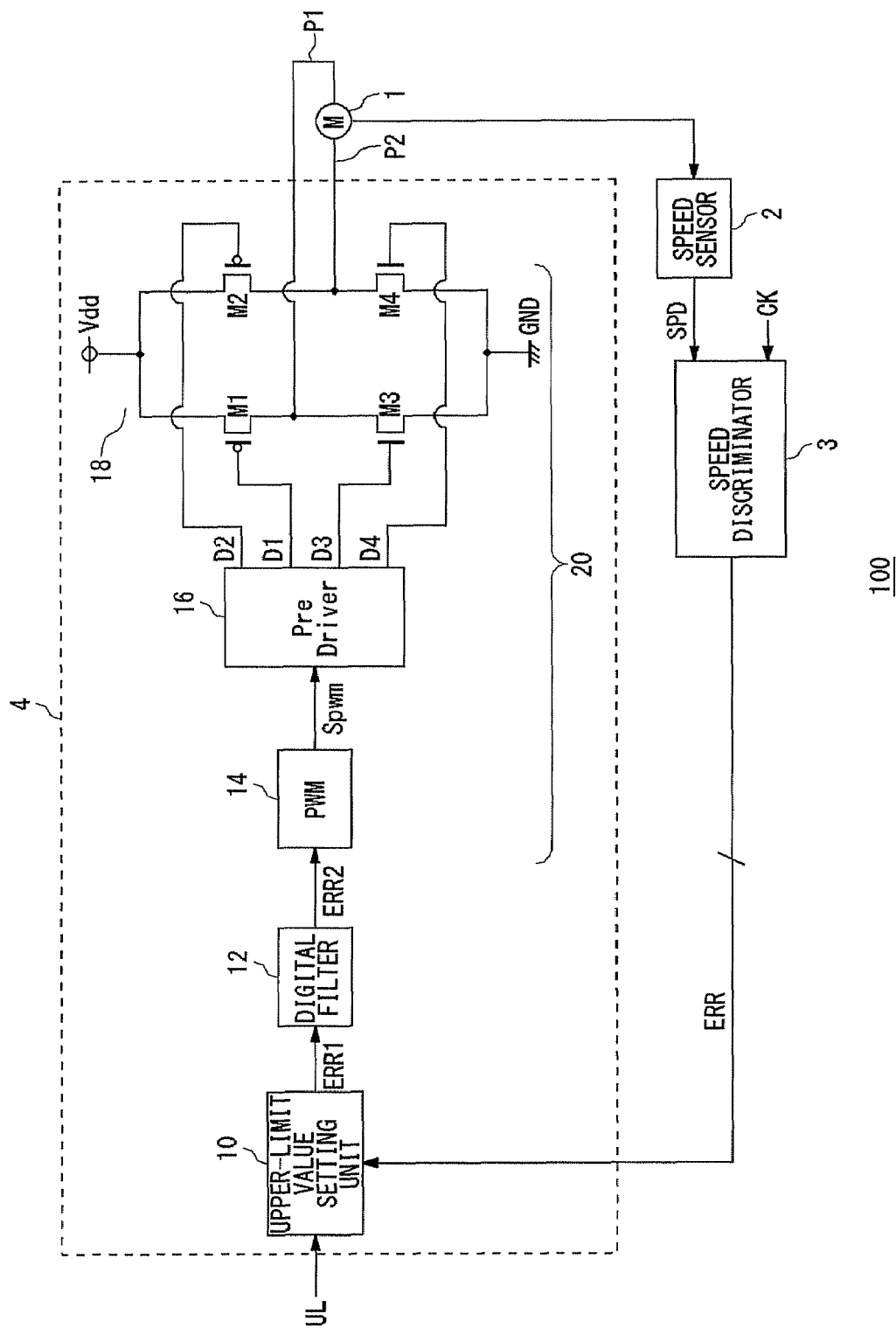
FIG. 1 is a block diagram showing a configuration of a motor driving apparatus according to a first embodiment.

FIG. 1 is a block diagram showing a configuration of a motor driving apparatus 100 according to a first embodiment. FIG. 1 shows a motor 1, which a subject to be driven, together with the motor driving apparatus 100. The motor 1 and the motor driving apparatus 100 are mounted to an electronic apparatus having a movable unit. The motor 1 is connected to the movable unit of the electronic apparatus. The rotation speed of the motor 1 is controlled by the motor driving apparatus 100, whereby the motor 1 drives the movable unit. For example, the electronic apparatuses include a digital still camera or digital video camera, wherein the motor 1 is utilized for moving a lens or shutter.

The motor driving apparatus 100 drives the motor in such a manner that the rotation speed thereof approaches a desired target value, while monitoring the rotation speed of the motor 1. The motor driving apparatus 100 has a speed sensor 2, speed discriminator 3, and motor driving circuit 4.

The speed sensor 2 detects the rotation speed of the motor 1, which is a subject to be driven, and outputs the speed information of the motor 1 as a speed signal SPD. For example, the speed sensor 2 may detect an electric current flowing through the motor 1, and convert the detected current into the speed information. Alternatively, the speed sensor 2 may perform the detection of the speed with the use of a Hall device. In the present embodiment, the speed signal SPD is a periodic signal having a frequency proportional to the rotation speed of the motor 1.

The speed discriminator 3 receives the speed signal SPD, which is an output signal of the motor 1, and a clock signal CK having a frequency according to the target value of the rotation speed of the motor. The clock signal CK is supplied from a clock signal generating unit (not shown). The speed discriminator 3 compares the frequency of the reference clock signal CK and the frequency of the speed signal SPD so as to output an error signal ERR having the digital value according to the deviation of the frequencies of two signals. Therefore, the digital value of the error signal ERR increases as the difference between the current rotation speed of the motor 1 and the target value increases. The error signal ERR produced by the speed discriminator 3 is output to the motor driving circuit 4.

The motor driving circuit 4 drives the motor 1 on the basis of the error signal ERR output from the speed discriminator 3. The motor driving circuit 4 has an upper-limit value setting unit 10, digital filter 12, pulse-width modulator 14, pre-driver 16, and H-bridge circuit 18, and the motor driving circuit 4 is composed as a functional IC (Integrated Circuit) on one semiconductor substrate.

The upper-limit value setting unit 10 sets the upper limit value to the digital value of the error signal ERR output from the speed discriminator 3. The upper-limit value setting unit 10 will be described later.

The digital filter 12 is a low-pass filter that eliminates the high-frequency component of the error signal ERR, which is output from the speed discriminator 3 and input through the upper-limit value setting unit 10. An error signal ERR2 from which the high-frequency component is eliminated is output to the pulse-width modulator 14. In the first embodiment, the structure of the digital filter 12 is not particularly limited. The digital filter 12 may be formed in IIR, or FIR (Finite Impulse Response), or hybrid of these.

The pulse-width modulator 14, pre-driver 16, and H-bridge circuit 18 function as a driving unit 20 that controls the current flowing through the motor 1 with a PWM (Pulse Width Modulation) system according to the digital value of the error signal ERR2 from which the high-frequency component is eliminated by the digital filter 12.

The pulse-width modulator 14 outputs a pulse-width modulation signal Spwm having a duty ratio according to the value of the error signal ERR2. The pre-driver 16 produces driving signals D1 to D4 on the basis of the pulse-width modulation signal Spwm, and supplies them to the H-bridge circuit 18 at the following stage. The pre-driver 16 turns on a pair of switching transistors M1 and M4 or a pair of M2 and M3 during ON-period corresponding to the high-level or low-level of the pulse-width modulation signal Spwm. Accordingly, the motor 1 is driven with a high torque to rotate with high rotation speed, as the ON-period of the pulse-width modulation signal Spwm is long.

The H-bridge circuit 18 is a switching circuit that supplies either one of a power supply voltage Vdd and ground voltage GND to both ends of a coil of the motor 1, which is a subject to be driven. The H-bridge circuit 18 includes first to fourth switching transistors M1 to M4.

The first switching transistor M1 is a P-channel MOSFET (Metal Oxide Semiconductor Field Effect Transistor), and the third switching transistor M3 is an N-channel MOSFET. They are serially connected between a power supply line from which the power supply voltage Vdd is supplied and the ground. The voltage Vsw1 at the joint point of the first switching transistor M1 and the third switching transistor M3 is supplied to a terminal P1 of the motor 1.

Similarly, the second switching transistor M2 and the fourth switching transistor M4 are serially connected between the power supply line and the ground, and the voltage Vsw2 at the joint point of two transistors is supplied to a terminal P2 of the motor 1.

The ON/OFF states of the first to fourth switching transistors M1 to M4 are controlled by the driving signals D1 to D4 produced by the pre-driver 16. Specifically, the driving phase is determined, i.e., it is determined which one of pair of the switching transistors M1 and M4 and the pair of the switching transistors M2 and M3 is driven, in accordance with the position of a rotor of the motor 1. Further, in the driven pair, the high-side switching transistor M1 (or M2) is fixedly turned ON and the low-side switching transistor M4 (or M3) is turned ON or OFF according to the duty ratio of the pulse-width modulation signal Spwm.

As described above, the path of the motor 1, speed sensor 2, speed discriminator 3, upper-limit value setting unit 10, digital filter 12, pulse-width modulator 14, pre-drive 16, and H-bridge circuit 18 forms a feedback loop in the motor driving apparatus 100 in FIG. 1. By the feedback, the duty ratio of the pulse-width modulation signal Spwm is adjusted such that the rotation speed of the motor 1 approaches the target value, and hence, the rotation speed of the motor 1 is controlled.

The setting of the upper limit value of the error signal ERR, which is one of the features of the motor driving apparatus 100 according to the present embodiment, will be explained in detail. In the present embodiment, it is supposed that the error signal ERR output from the speed discriminator 3 is m-bit (m is a natural number). The upper-limit value setting unit 10 invalidates the high-order n-bit (n is a natural number satisfying n<m) among all m bits of the error signal ERR in order to set the upper limit value to the error signal ERR. The invalidation forces the high-order n-bit to be zero.

In case where m=8, for example, the upper limit value of the error signal ERR is set to 255 (=[11111111]) when n=0, the upper limit value of the error signal ERR is set to 127 (=[01111111]) when n=1, and the upper limit value of the error signal ERR is set to 63 (=[00111111] when n=2.

The invalidated bit number n is preferably configured to be settable according to an externally input setting signal. An upper-limit setting signal UL is input to the motor driving circuit 4 in the present embodiment as a serial signal or parallel signal, and the upper-limit value setting unit 10 sets the upper limit value of the error signal ERR according to the upper-limit setting signal UL.

Figure 2A:
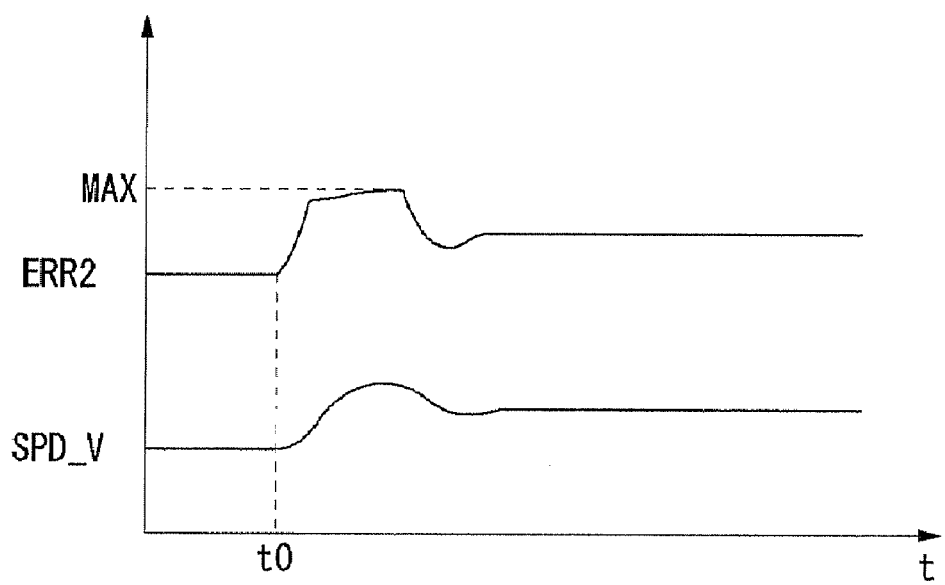
FIGS. 2A and 2B are time charts showing the operation state of the motor driving apparatus shown in FIG. 1.
Figure 2B:
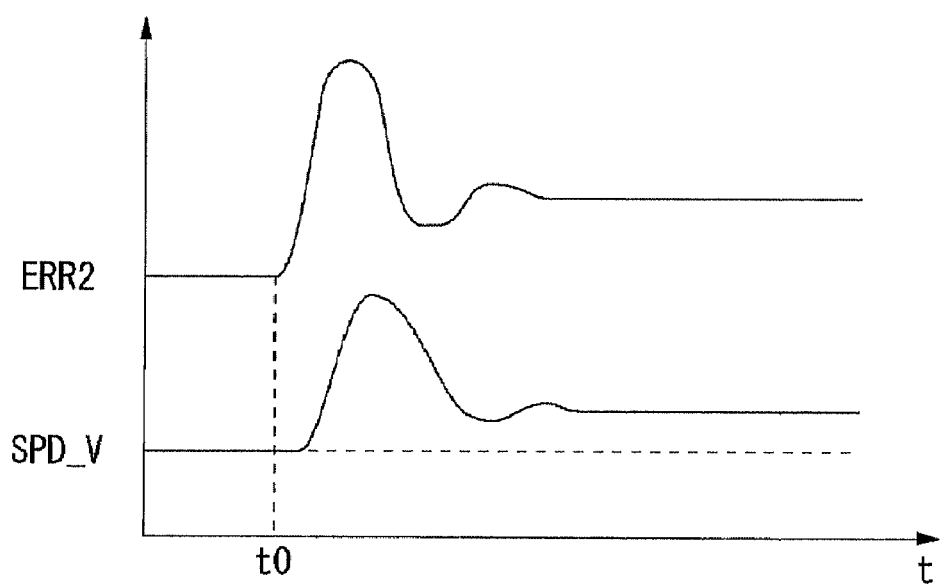

The operation of the motor driving apparatus 100 thus configured in FIG. 1 will be explained. FIGS. 2A and 2B are time charts showing the operation state of the motor driving apparatus 100 in FIG. 1. FIG. 2A indicates a waveform in case where the upper-limit value setting unit 10 becomes active and the upper-limit value is set to the error signal ERR, while FIG. 2B indicates a waveform in case where the setting of the upper limit value by the upper-limit value setting unit 10 is not performed.

FIGS. 2A and 2B respectively show the error signal ERR2 from which the high-frequency component is eliminated by the digital filter 12, and a signal SPD_V obtained by performing a frequency voltage conversion (F/V conversion) on the speed signal SPD output from the speed sensor 2. The signal SPD_V does not have a waveform actually produced in the motor driving apparatus 100 in FIG. 1, but is a signal for understanding of the operation, and this signal indicates the value corresponding to the rotation speed of the motor 1. It is to be noted that each of the time charts shown in FIGS. 2A and 2B has an axis of ordinate and an axis of abscissa appropriately enlarged or reduced in order to simplify the explanation.

The operation in case where the upper-limit value setting unit 10 is not operated will firstly be explained with reference to FIG. 2B in order to clarify the effect of the setting of the upper limit value to the error signal ERR by the upper-limit value setting unit 10. This case is substantially equivalent to the case in which the upper-limit value setting unit 10 is not provided, which indicates the operation of a conventional motor driving apparatus.

The motor 1 is stopped before a time t0. At the time t0, the instruction is given to start the rotation of the motor 1, so that the clock signal CK having the frequency corresponding to the target value of the rotation speed of the motor 1 is input to the speed discriminator 3. Since the rotation speed of the motor 1 is zero at this point, the error signal ERR output from the speed discriminator 3 sharply increases. The band of this error signal ERR is restricted by the digital filter 12, thereby achieving the error signal ERR2 shown in FIG. 2B. When the error signal ERR2 increases, the pulse-width modulator 14 produces a pulse-width modulation signal Spwm having a great duty ratio, as shown in FIG. 2B. As a result, the time for energizing the coil of the motor 1 is set to be long, so that the rotation speed of the motor 1 also sharply increases. With the increase of the rotation speed of the motor 1, the signal SPD_V obtained by performing the frequency voltage conversion on the speed signal SPD detected by the speed sensor 2 also increases. If the sampling frequency of the digital filter 12 is high, and the band of the feedback loop formed to the motor driving apparatus 100 is sufficiently wide, the feedback is formed in the direction in which the error signal ERR2 reduces so as not to increase the rotation speed of the motor 1 over the target value after the error signal ERR2 temporarily increases. Therefore, the speed signal SPD_V does not increase greatly over the target value as shown in FIG. 2B. However, in a normal motor driving apparatus, the sampling frequency of the digital filter 12 cannot be increased so much due to the restriction of the circuit size, with the result that an overshoot in which the rotation speed of the motor 1 greatly exceeds the target value occurs as shown in FIG. 2B. Thereafter, the error signal ERR2 is decreased in order to reduce the rotation speed of the motor 1 that has increased too much with respect to the target value, resulting in that the rotation speed of the motor 1 reduces to approach the target value.

Next, the operation of the motor driving apparatus 100 according to the present embodiment will be explained with reference to FIG. 2A. When an instruction is given to start the rotation of the motor 1 at the time t0, the error signal ERR2 increases like the case in FIG. 2B. However, since the error signal ERR1 is limited to be not more than the upper limit value set by the upper-limit value setting unit 10, the error signal ERR2 output from the digital filter 12 is also limited to be not more than a certain limit value MAX. As a result, the duty ratio of the pulse-width modulation signal Spwm is limited to be not more than a predetermined value, whereby the overshoot of the rotation speed of the motor 1 can be prevented. Further, compared to FIG. 2A, the starting time taken for the rotation speed to be stabilized at the target value can be shortened.

Since the upper limit value can be externally changed by the upper-limit setting signal UL, the upper limit value can be adjusted in accordance with various setting conditions such as the type of the motor 1 that is the subject to be driven, the band of the digital filter 12, the prevention of the overshoot and the shortening of the starting time can more effectively be performed.

Second Embodiment

In the motor driving apparatus 100 according to the above-mentioned first embodiment, the upper-limit value setting unit 10 is provided to set the upper limit value to the error signal ERR, whereby the prevention of the overshoot and the shortening of the starting time can be realized. The motor driving apparatus 100 according to the second embodiment has a feature in the digital filter 12, and the other configurations are the same as those of the motor driving apparatus 100 according to the first embodiment shown in the block diagram of FIG. 1.

Figure 3B:
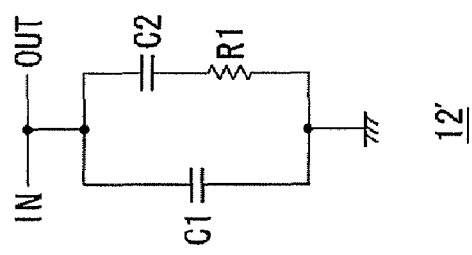
FIGS. 3A and 3B are circuit diagrams showing a configuration of a digital filter of a motor driving apparatus according to a second embodiment.
Figure 3A:
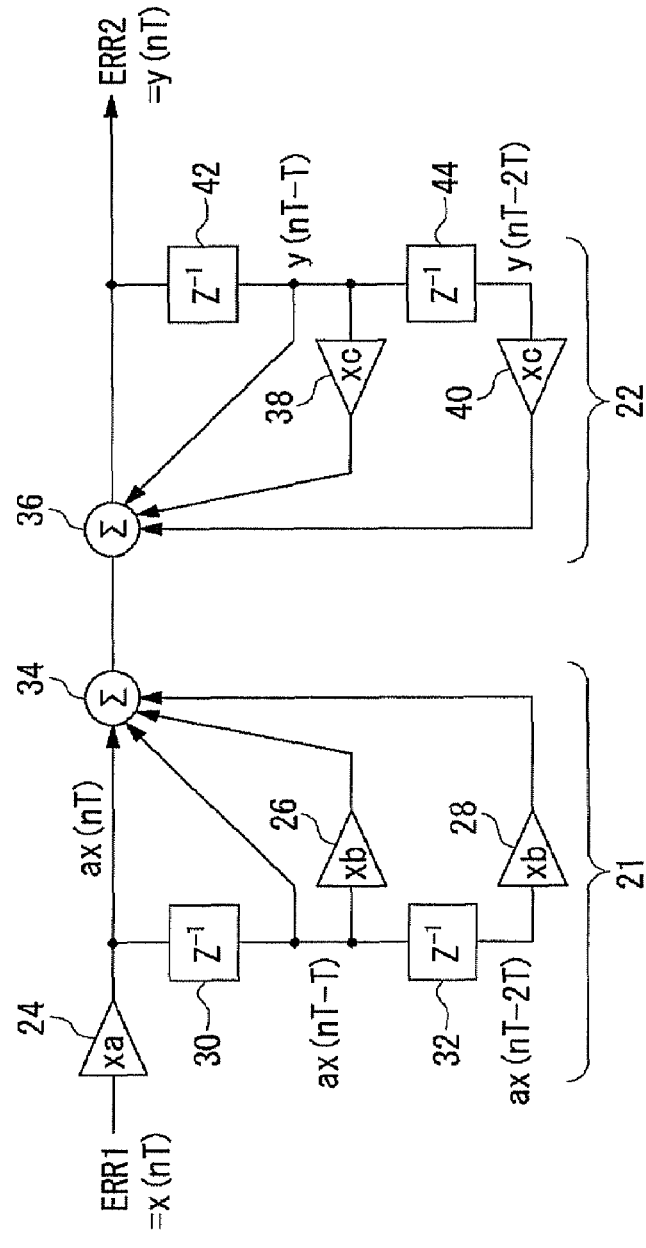

FIGS. 3A and 3B are circuit diagrams showing the configuration of the digital filter 12 in the motor driving apparatus 100 according to the second embodiment. FIG. 3A is a diagram showing the configuration of the digital filter 12, and FIG. 3B shows the configuration of an analog filter that is equivalent to FIG. 3A.

An analog filter 12' in FIG. 3B is a low-pass filter including capacitors C1 and C2 and resistor R1. The transfer function of the analog filter in FIG. 3B is $$H(s) = H \times (1 + \omega 2/s)/(1 + \omega 1/s) \quad (1)$$

Here, $\omega 1 = (C1+C2)/(C1 \cdot C2 \cdot R)$, $\omega 2 = 1/(C2 \cdot R)$, $H = C2 \cdot R/(C1+C2)$, and C1, C2 and R1 respectively indicate capacitance values and resistance value of the capacitors C1 and C2 and the resistor R1 shown in FIG. 3B.

When the constant term H is omitted from the equation (1), and the approximation by a bilinear S-Z transform is carried out with the use of the approximate equation of the equation (2), an equation (3) is obtained.

$$s = 2/T \cdot (1 - Z^{-1})/(1 + Z^{-1}) \quad (2)$$

$$H(z) = Y(z)/X(z) \quad (3)$$
$$= a(1 + Z^{-1} + bZ^{-1} + bZ^{-2}/(1 - Z^{-1} - cZ^{-1} + cZ^{-2})$$

wherein a, b, and c are constants.

When the equation (3) is converted into a differential equation of a time region, an equation (4) is obtained.

$$y(nT) = a(x(nT) + x(nT-T) + bx(nT-T) + bx(nT-2T) - \{-y(nT-T) - cy(nT-T) + cy(nT-2T)\} \quad (4)$$

The digital filter 12 in FIG. 3A is composed of a hybrid of a secondary FIR (Finite Impulse Response) system 21 and an IIR system 22, and satisfies the differential equation (4). The digital filter in FIG. 3A and the analog filter in FIG. 3B are equivalent.

The value of the error signal ERR1 input to the digital filter 12 at a time nT is represented by x(nT), and the value of the error signal ERR2 output from the digital filter 12 at the time nT is represented by y(nT).

The FIR system 21 includes a first multiplier 24, second multiplier 26, third multiplier 28, first delay circuit 30, second delay circuit 32, and first adder 34. The first multiplier 24 multiplies x(nT) by a coefficient a to produce ax(nT). The first delay circuit 30 delays ax(nT) by one sampling time T to produce ax(nT-T). The second multiplier 26 multiplies ax(nT-T) by a coefficient b. The second delay circuit 32 further delays ax(nT-T) by one sampling time T to produce ax(nT-2T) The third multiplier 28 multiplies ax(nT-2T) by the coefficient b. The first adder 34 adds the outputs from the first multiplier 24, first delay circuit 30, second multiplier 26, and third multiplier 28. The output of the first adder 34 becomes a{x(nT)+x(nT-T)+bx(nT-T)+bx(nT-2T)}.

The IIR system 22 includes a second adder 36, fourth multiplier 38, fifth multiplier 40, third delay circuit 42, and fourth delay circuit 44. The third delay circuit 42 produce sy(nT-T) that is obtained by delaying the output y(nT) by one sampling time T. The fourth multiplier 38 multiplies y(nT-T) by a coefficient c. The fourth delay circuit 44 produces y(nT-2T) that is obtained by further delaying y(nT-T) by one sampling time T. The fifth multiplier 40 multiplies y(nT-2T) by the coefficient c. The second adder 36 adds the outputs from the first adder 34, third delay circuit 42, fourth multiplier 38, and fifth multiplier 40.

Each of the operators (24, 26, ..., 42, 44) composing the digital filter 12 in FIG. 3A can be composed of a dedicated DSP (Digital Signal Processor), a general-purpose arithmetic operation circuit that executes an operation on the basis of a predetermined program, or a combination thereof.

Since the digital filter 12 in FIG. 3A is equivalent to the low-pass filter in FIG. 3B, its output y(nT) is a signal obtained by eliminating a high-frequency component from the input x(nT) of the digital filter 12.

The digital filter 12 in FIG. 3A has a function of initializing the output y(nT) to a predetermined value y0 upon starting the motor 1. This function is specifically realized by writing the data, which corresponds to the initial value y0, in a memory region where y(nT) is retained. This initial value y0 can externally be set. The initial value y0 may be optimized in accordance with the type of the motor 1 that is the subject to be driven, the band of the digital filter 12, and the like. The initial value y0 may be optimized by an experiment, simulation, or a combination thereof within a range where the initial value of the duty ratio of the pulse-width modulation signal Spwm is 0% to 100%.

In the present embodiment, the output y(nT) is the output from the digital filter 12, and also the output from the IIR system 22. In the IIR system 22, the output y(nT) is affected not only by the input x(nT) but also by its past output y(nT-T) and y(nT-2T). Therefore, the initial value y0 is set to the output y(nT) upon starting the motor 1, whereby even if the input x(nT) sharply changes, the output y(nT) does not sharply change, but gradually changes from the initial value y0. As a result, the duty ratio of the pulse-width modulation signal Spwm gradually changes to the duty ratio according to the input x(nT) from the value corresponding to the initial value y0. When the duty ratio of the pulse-width modulation signal Spwm is sharply increased from the state in which the motor 1 is stopped, the rotation speed of the motor 1 might be overshot due to the restriction on the band of the feedback loop or the sampling frequency of the digital filter 12. On the other hand, if the output y(nT) of the digital filter 12 is initialized beforehand to the initial value y0, and then, the drive is started like in the present embodiment, the duty ratio of the pulse-width modulation signal Spwm is gradually changed from the value corresponding to the initial value y0, whereby the overshoot of the rotation speed of the motor 1 can be prevented, and the starting time taken for the rotation speed to be stabilized at the target value can be shortened.

The aforesaid embodiment is only illustrative, and various modifications are possible for the combination of each component and each process. Further, it would be understood by a person skilled in the art that the modifications described above are included within the scope of the present invention.

In the first and second embodiments, the upper limit is set to the error signal ERR by invalidating the high-order bit of the error signal ERR. However, the present invention is not limited thereto. For example, instead of the invalidation of the high-order bit, the upper-limit value setting unit 10 compares the error signal ERR to the upper limit value MAX, and the MAX may be output as it is when ERR≧MAX, and the ERR may be output as it is when ERR<MAX.

In the second embodiment, the upper limit value is set to the error signal ERR, and further, the initial value y0 is set to the error signal ERR2 that is the output y(nT) of the digital filter 12, whereby the overshoot can further be prevented and the starting time can be shortened more than the motor driving apparatus 100 according to the first embodiment. However, the present invention is not limited thereto. The overshoot of the rotation speed of the motor 1 upon starting the motor can be prevented compared to the conventional motor driving apparatus only by setting the initial value to the error signal ERR2.

In the embodiments, the motor 1 is driven by the H-bridge circuit. However, the present invention is not limited thereto. The present invention is applicable to the other driving methods. Although the pulse width of the error signal ERR2 is modulated by the pulse-width modulator 14, and the motor 1 is driven on the basis of the pulse-width modulation signal Spwm in the embodiments, the motor 1 may be linearly driven on the basis of the error signal ERR2. Further, the other pulse-width modulation systems, such as a pulse-frequency modulation (PFM), may be employed, instead of the pulse-width modulation.

The motor driving circuit 4 according to the embodiments drives the motor 1 on the basis of the error signal ERR corresponding to the deviation between the rotation speed of the motor 1 and the frequency of the clock signal CK by the speed discriminator 3. As the modification, the coil current of the motor 1 may be converted into a voltage, the error voltage between this voltage and the target voltage corresponding to the target torque of the motor may be subject to an analog/digital conversion to obtain a signal, and the obtained signal may be defined as the error signal.

In the embodiments, all the components composing the motor driving circuit 4 may be integrated on one semiconductor substrate. Alternatively, the components composing the motor driving circuit 4 may be formed in another integrated circuit, wherein a part thereof may be composed of discrete components. Which part is integrated may be determined according to the cost, occupied area or usage.

While the preferred embodiments of the present invention have been described using specific terms, such description is for illustrative purposes only, and it is to be understood that changes and variations may be made without departing from the spirit or scope of the appended claims.

What is claimed is:

1. A motor driving circuit that receives an error signal having a digital value corresponding to a deviation between a current rotation speed of a motor, which is a subject to be driven, and its target value, so as to drive the motor, comprising:
    a digital filter that eliminates a high-frequency component of the error signal;
    a driving unit that controls an electric current flowing through the motor in accordance with the digital value of the error signal from which the high-frequency component is eliminated by the digital filter; and
    an upper-limit value setting unit that sets an upper limit value to the digital value of the error signal input to the digital filter, and wherein
    the upper-limit value setting unit is configured to change the upper limit value according to a setting signal from the outside and wherein
    the error signal comprises m bits, where m is a natural number; and
    the upper-limit value setting unit invalidates the high-order n bits, where n is a natural number satisfying n<m, of the digital value of the error signal.

2. A motor driving circuit according to claim 1, wherein the bit number n that is to be invalidated can be externally set.

3. A motor driving circuit according to claim 1, wherein the error signal is an output from a speed discriminator that outputs a digital signal according to a frequency deviation between an output signal from a speed sensor, which detects the rotation speed of the motor, and a clock signal according to the target value of the rotation speed.

4. A motor driving circuit according to claim 1, wherein at least a part of the digital filter is composed of an infinite impulse response type, and the value of the output from a filter block of the infinite impulse response type is initialized to a predetermined initial value upon starting the drive of the motor.

5. A motor driving circuit according to claim 4, wherein the initial value of the output from the filter block of the infinite impulse response type can be externally set.

6. A motor driving circuit according to claim 1, which is integrated on one semiconductor substrate.

7. A motor driving circuit according to claim 1, wherein the driving unit comprises:
    a pulse-width modulator that generates a pulse signal subjected to pulse width modulation in accordance with the digital value of the error signal;
    an H-bridge circuit connected to the coil of the motor; and
    a pre-driver that drives the H-bridge circuit according to the pulse signal.

8. A motor driving apparatus comprising:
    a speed sensor that produces a speed signal having a frequency according to a rotation speed of a motor, which is a subject to be driven;
    a clock signal generating unit that generates a clock signal having a frequency according to a target value of the rotation speed of the motor;
    a speed discriminator that receives the speed signal output from the speed sensor and the clock signal so as to output an error signal having a digital value according to the deviation between the frequencies of two signals; and
    a motor driving circuit that drives the motor on the basis of the error signal output from the speed discriminator, the motor driving circuit comprising:
        a digital filter that eliminates a high-frequency component of the error signal;
        a driving unit that controls an electric current flowing through the motor in accordance with the digital value of the error signal from which the high-frequency component is eliminated by the digital filter; and
        an upper-limit value setting unit that sets an upper limit value to the digital value of the error signal input to the digital filter, and wherein
        the upper-limit value setting unit is configured to change the upper limit value according to a setting signal from the outside and wherein
        the error signal comprises m bits, where m is a natural number; and
        the upper-limit value setting unit invalidates the high-order n bits, where n is a natural number satisfying n<m, of the digital value of the error signal.

9. An electronic apparatus comprising:
    a motor driving apparatus that drives the motor; and
    a movable unit whose position is changed by the motor;
    wherein the motor driving apparatus comprises:
        a speed sensor that produces a speed signal having a frequency according to a rotation speed of a motor, which is a subject to be driven;
        a clock signal generating unit that generates a clock signal having a frequency according to a target value of the rotation speed of the motor;

a speed discriminator that receives the speed signal output from the speed sensor and the clock signal so as to output an error signal having a digital value according to the deviation between the frequencies of two signals; and
a motor driving circuit that drives the motor on the basis of the error signal output from the speed discriminator, the motor driving circuit comprising:
  a digital filter that eliminates a high-frequency component of the error signal;
  a driving unit that controls an electric current flowing through the motor in accordance with the digital value of the error signal from which the high-frequency component is eliminated by the digital filter; and
  an upper-limit value setting unit that sets an upper limit value to the digital value of the error signal input to the digital filter, and wherein
the upper-limit value setting unit is configured to change the upper limit value according to a setting signal from the outside and wherein
the error signal comprises m bits, where m is a natural number; and
the upper-limit value setting unit invalidates the high-order n bits, where n is a natural number satisfying n<m, of the digital value of the error signal.

* * * * *